(12) United States Patent
Christiansen et al.

(10) Patent No.: US 12,247,544 B2
(45) Date of Patent: Mar. 11, 2025

(54) SLIDING ROOF SYSTEM FOR A NACELLE

(71) Applicant: Siemens Gamesa Renewable Energy A/S, Brande (DK)

(72) Inventors: Jacob Christiansen, Lunderskov (DK); Kenneth Svendsen, Silkeborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/276,195

(22) PCT Filed: Dec. 28, 2021

(86) PCT No.: PCT/EP2021/087698
§ 371 (c)(1),
(2) Date: Aug. 8, 2023

(87) PCT Pub. No.: WO2022/174970
PCT Pub. Date: Aug. 25, 2022

(65) Prior Publication Data
US 2024/0102445 A1 Mar. 28, 2024

(30) Foreign Application Priority Data
Feb. 19, 2021 (EP) .................................. 21158030

(51) Int. Cl.
*F03D 1/00* (2006.01)
*F03D 13/10* (2016.01)
(Continued)

(52) U.S. Cl.
CPC ............ *F03D 1/101* (2023.08); *F03D 13/122* (2023.08); *F03D 13/139* (2023.08); *F03D 80/50* (2016.05); *F03D 80/881* (2023.08)

(58) Field of Classification Search
CPC ........ F03D 1/101; F03D 80/50; F03D 80/881; F03D 13/139; F03D 13/122
See application file for complete search history.

(56) References Cited

U.S. PATENT DOCUMENTS

2016/0237986 A1*  8/2016  Abolfazlian ............ F01D 25/12
2020/0011302 A1*  1/2020  Taubenrauch ............ E01F 3/00

FOREIGN PATENT DOCUMENTS

| EP | 1101934 A2 | 5/2001 |
|----|------------|--------|
| EP | 1677000 A2 | 7/2006 |

(Continued)

OTHER PUBLICATIONS

PCT International Search Report and Written Opinion of International Searching Authority mailed Apr. 7, 2022 corresponding to PCT International Application No. PCT/EP2021/087698 filed Dec. 28, 2021.

*Primary Examiner* — Sean Gugger
(74) *Attorney, Agent, or Firm* — Schmeiser, Olsen & Watts LLP

(57) ABSTRACT

A nacelle for a wind turbine includes a nacelle roof and a first wind turbine component, wherein the nacelle roof is configured to cover the first wind turbine component, the nacelle roof including a first sliding section and a second sliding section, wherein the first sliding section and/or the second sliding section is configured to slide over at least a part of the surface of the nacelle roof, wherein the first sliding section and the second sliding section are moveable between a closed position, in which the first wind turbine component is covered by the nacelle roof, and an opened position, resulting in an opening of the nacelle roof through which the first wind turbine component is hoisted.

13 Claims, 9 Drawing Sheets

(51) Int. Cl.
 F03D 80/50 (2016.01)
 F03D 80/80 (2016.01)

(56) References Cited

FOREIGN PATENT DOCUMENTS

| EP | 2759701 A1 * | 7/2014 | ............ F03D 15/00 |
| WO | 2012107049 A1 | 8/2012 | |
| WO | 2019042507 A1 | 3/2019 | |

\* cited by examiner

SLIDING ROOF SYSTEM FOR A NACELLE

CROSS-REFERENCE TO RELATED APPLICATIONS

This application claims priority to PCT Application No. PCT/EP2021/087698, having a filing date of Dec. 28, 2021, which claims priority to EP Application No. 21158030.3, having a filing date of Feb. 19, 2021, the entire contents both of which are hereby incorporated by reference.

FIELD OF TECHNOLOGY

The following relates to a nacelle for a wind turbine. The following further relates to a method for mounting or demounting a first wind turbine component in a nacelle of a wind turbine.

BACKGROUND

Wind turbines are increasingly used for the generation of electrical energy. A wind turbine typically comprises a tower and a nacelle mounted on the tower, to which a hub is attached. A rotor is mounted at the hub and coupled to a generator. A plurality of blades extends from the rotor. The blades are oriented in such a way that wind passing over the blades turns the rotor and rotates the shaft, thereby driving the generator to generate electricity.

The current development of the technology of wind turbines tends to an increased size of wind turbines for harvesting more wind energy, with longer blades and higher towers. As more energy is produced, the size and weight of the drive train components, i.e. the gearbox, the generator or the power electronics, and the components connected to the drive train components have increased in size as well. For direct drive turbines, i.e. turbines without a gearbox where the hub is directly connected to the generator, the size of these components is also increasing.

The increased size and the heavy weight of the components in the nacelle increase the difficulty of the installation of the components during the wind turbine assembly or the replacement of the components at the installation site.

Heavy components of the nacelle of wind turbines are typically handled or replaced by means of external cranes installed at the ground. Such cranes are large and bulky, thus not efficient for lowering the parts from the nacelle to the ground or for hoisting them back to the nacelle. Besides, these cranes are expensive so that only a limited number of cranes are available per wind farm.

Additionally, the space in the nacelle is very limited, as the drive train components are arranged inside the housing of the nacelle, the so-called canopy. This is however necessary, as wind turbines are placed at locations providing high wind amounts, but also with very rough weather conditions. Hence, the internal components of the nacelle are protected by means of the canopy against the harsh environmental conditions of the installation site.

A known alternative to expensive ground cranes for maintenance or replacement of the components of the nacelle is the use of cranes fixed or detachably installed inside the nacelle or on the nacelle. For cranes installed inside the nacelle, a large enough opening has to be provided to be able to move the crane between a stowed position underneath the nacelle roof, i.e. completely within the nacelle, to an operational position. Additionally, the opening has to be large enough to allow for both the movement of the crane and the hoisting of the nacelle component.

EP 1 101 934 A2 discloses a wind turbine with a crane on the nacelle, the nacelle having an opening in the bottom for introducing components into the nacelle through the opening. Similarly, WO2019042507A1 shows a nacelle with a hatch in its lower part through which components can be hoisted from the ground to the inside of the nacelle. However, having an opening at the bottom of the nacelle increases the risks for heavy components and operators inside the nacelle, as they might fall down through the opening if it is not correctly and securely closed. Additionally, there is not much space for heavy and big components to pass through the opening.

Hence, it is safer to have openings on top of the nacelle instead of on the bottom of the nacelle. EP 1 677 000 A2 provides a procedure to remove the cover roof based on guide rails with long holes and pins to shift and pivot the cover roof sideways, leaving the upper part of the nacelle open. This solution is also risky, as the roof will be hanging sideways and might fall down, as it is only supported by cables attached to the guides of the roof.

WO2012/107049 A1 discloses a nacelle roof comprising a plurality of panels which can be moved between an opened and a closed position by means of a hinge, which allows the rotation of the panels. These panels are configured to be opened and closed individually by separate mechanical or electrical actuators. The embodiments shown here are expensive, as for each panel a separate actuator is needed and the actuator needs to be big enough to completely open the panel and ensure adequate clearance of the openings to allow components such as a crane within the nacelle to be able to operate on the nacelle. Additionally, opened panels are an obstacle when hoisting components from the outside inside the nacelle, as the harsh weather conditions of wind farm locations might result in wind pushing the hinged components against the perpendicular panels, causing damage to the canopy. Moreover, alternatives to the actuators must be added for the embodiments shown here for the case of malfunction of the actuators.

The document shows an embodiment with a nacelle roof including a bifurcated sliding cover which covers the crane in the stowed position. This is clearly a cover for the crane, comprising a protruding portion in which the boom of the crane is fitted. The cover is divided in a forward portion and a rear portion and for opening the cover to deploy the crane, the forward portion slides forward and the rear portion slides rearward along the nacelle roof by means of a mechanical or electrical actuator. An issue with this embodiment is that due to the fact that the cover is also a crane cover, the protrusion takes too much space and it is not possible to stack the cover parts together to maximize the opening area and be able to hoist large components from the ground to the nacelle. Additionally, the opening is limited to the components underneath the cover. Hence, the components of the nacelle which are under the parts outside the cover area will have to be first moved inside the nacelle to the opening area and then lifted out of the nacelle through the opening. Therefore, a mechanism to transport components within the nacelle is needed for this solution.

Hoisting components of the nacelle for replacement of maintenance purposes is a complicated process in which the opening of the cover of the nacelle has to be large enough for the components to pass through the opening. Parts of the nacelle roof should not be an obstacle when moving the parts with a crane. A crane installed in the nacelle or on the nacelle should be used as it is a cheaper option than a ground crane.

SUMMARY

An aspect relates to provide a nacelle comprising a nacelle roof with openings large enough to be able to hoist wind turbine components in and out of the nacelle that overcomes the problems described above.

A nacelle for a wind turbine according to embodiments of the invention comprises a nacelle roof and a first wind turbine component. The nacelle roof is configured to cover the first wind turbine component to protect the first wind turbine component.

According to embodiments of the invention, the nacelle roof comprises a first sliding section and a second sliding section. The first sliding section is configured to slide over at least a part of the surface of the nacelle roof and/or the second sliding section is configured to slide over at least a part of the surface of the nacelle roof. The first sliding section and/or the second sliding section are moveable between a closed position, in which the first wind turbine component is covered by the nacelle roof, and an opened position, resulting in an opening of the nacelle roof through which the first wind turbine component can be hoisted.

In the opened position of the first sliding section and/or the second sliding section, the opening permits access to the interior of the nacelle. In the closed position of the first sliding section and/or the second sliding section, the first sliding section and/or the second sliding section restricts the access to the interior of the nacelle, for example by sealing the nacelle roof, thereby protecting the interior of the nacelle against rain and other environmental conditions and avoiding that components on the nacelle roof fall inside the nacelle, damaging other components in the nacelle. In a closed position, the first sliding section can be aligned with the second sliding section and/or with the rest of the nacelle roof.

The first wind turbine component is at least partially located under the first sliding section. Hence, the first wind turbine component can be protected by a closed first sliding section and the first wind turbine component can be hoisted through an opened first sliding section.

According to embodiments of the invention, the first sliding section is configured to slide over the second sliding section and/or the second sliding section is configured to slide over the first sliding section. Hence, the first sliding section can be configured to slide over at least the second sliding section but may also slide over further parts of the nacelle roof. Similarly, the second sliding section can also be configured to slide over at least the first sliding section but may also slide over further parts of the nacelle roof.

In the prior art, the sliding sections known are shifted over a static section of the roof of the nacelle and can only be moved from an opened position to a closed position, the static section of the nacelle roof being the part of the nacelle roof fixed to the housing or canopy of the nacelle. However, according to embodiments of the invention, the first and/or second sliding sections are configured to slide over each other, thereby increasing the possibilities of opening the roof. Additionally, it is not necessary for the sliding sections to slide from the closed position to the opened position over the static section of the nacelle roof. Hence, the static section of the nacelle roof does not slide or hinge to allow for an opening in the nacelle roof, as it is fixed to the structure of the nacelle. As seen in the prior art, if the sliding sections slide over the static section of the roof by moving from a closed position to an opened position, the static section of the roof needs to be suited for this purpose. Hence, usually the sliding surface of the static part of the roof shown in prior art documents over which the sliding sections slide is flat and free of other components, such as a heliport.

According to an embodiment, the first sliding section and/or the second sliding section is configured to be lifted by a lifting system, wherein the first sliding section is stackable over the second sliding section and/or the second sliding section is stackable over the first sliding section.

The sliding of the first over the second sliding section, as well as the sliding of the second over the first sliding section allows a simple and efficient way to stack these sliding roof sections on each other.

The feature of stacking the sliding sections on each other has two major advantages.

Firstly, only the sliding sections need to be suitable for the stacking, as the sliding sections do not necessarily need to be stacked on other parts of the roof. Hence, the other parts of the roof do not need to be configured to be suitable for the sliding mechanism.

Secondly, the accessibility to the roof and the flexibility of the opening mechanism is greatly improved over the disclosures given in the prior art. The opening under the first sliding section is accessible by sliding the first sliding section over the second sliding section. The opening under the second sliding section is accessible by sliding the second sliding section over the first sliding section. Additionally, the stack of the first and second sliding section can be moved over the surface of the nacelle roof, improving the flexibility of the opening system. For example, the stack can be moved to the middle of the opening, resulting in two smaller openings at the sides of the stack. At the opening on the one side of the stack, a crane can be deployed. Through the opening on the other side of the stack, a first wind turbine component can be hoisted.

The lifting of the first and/or second sliding section is achieved by the lifting system. This system can be a mechanical or electrical actuator-driven mechanism. This system can also be a hydraulic lifting unit.

According to an embodiment of the invention, the lifting system comprises shifting means coupled at the bottom part of the first sliding section and/or the second sliding section for allowing the sliding of the first and/or second sliding section over at least a part of the surface of the nacelle roof.

Under shifting means it is to be understood a means that allows the sliding of a sliding section. Hence, the shifting means can be rollers or wheels attached to the bottom part of a sliding section, allowing the sliding section to slide or shift over at least a part of the surface of the nacelle roof. Alternatively, the shifting means can be a sliding partner configured to slide on a low friction sliding surface arranged at at least a part of the surface of the nacelle roof.

The shifting means can be arranged parallelly to the longitudinal axis of the nacelle so that the sliding sections slide in a direction parallel to the longitudinal axis of the nacelle. Under longitudinal axis of the nacelle is to be understood the axis of the nacelle which goes from the front opening of the nacelle connecting the hub to the nacelle body to the rear side of the nacelle. If the wind turbine comprises a main shaft, this main shaft is usually parallel to this axis. The sliding of the sliding sections in a direction parallel to the longitudinal axis of the nacelle is advantageous, as the main components in the nacelle are arranged in this direction within the nacelle. Hence, the flexibility to move the opening of the nacelle roof over the desired component improves.

According to an embodiment of the invention, the lifting system further comprises rails placed under the shifting means, and studs supported on the nacelle by a supporting element, wherein an end of the studs abuts the rails.

This lifting system achieves the lifting of a specific sliding section by turning the studs corresponding to this sliding section, which then press the rails up increasing the height of the rails under the sliding section. When the sliding section has reached a sufficient height, the sliding section can be pushed or pulled to roll on another sliding section by means of shifting means, such as wheels.

According to another embodiment of the invention, a stack of the first sliding section and the second sliding section can axially move back and forth on at least a part of the surface of the nacelle roof. For example, the stack can axially move back and forth on the opening of the nacelle roof resulting from moving the first sliding section and/or the second sliding section from a closed position to an opened position. This allows to have the opening of the nacelle roof in a desired position as well as to have multiple openings on the nacelle roof.

According to another embodiment of the invention, the nacelle roof further comprises a static section, the static section being a part of the nacelle roof fixed to the housing of the nacelle, wherein the first sliding section and/or the second sliding section is configured to slide over at least a part of the static section.

The high axial mobility of the sliding sections allows to move the sliding sections over the opening of the roof as well as over static sections of the roof suited for the sliding sections to slide over them.

According to another embodiment of the invention, the stack of the first sliding section and the second sliding section can axially move back and forth on at least a part of the static section of the nacelle roof. Hence, not only a single sliding section can move over the static section of the roof, also a stack of sliding sections is configured to slide over the static section.

The advantage of having a static section of the nacelle roof suited for the sliding sections to slide over it and thus, for the sliding sections to be stacked on it is that the size of the opening can be maximized, as all the sliding sections can be stacked on the static section.

In the prior art, the static section needs to be suitable for covers to slide over it at both sides of the opening, as one cover is slid over one static section of the roof and another cover is slid over another static section of the roof different from the first static section. In contrast, according to this embodiment of the invention, only one region of the nacelle roof being a static part of the nacelle roof needs to be suitable for the sliding sections to slide over it. Due to the axial mobility of a stack of sliding sections, the stack can move freely on the opening and reach the region of the static section of the roof adapted for the stack to slide and be stacked on it.

According to another embodiment of the invention, the first sliding section and/or the second sliding section comprises a plurality of panels. The use of panels simplifies the production and the transport of the sliding sections, as well as the installation on the nacelle roof.

According to another embodiment of the invention, the nacelle further comprises a second wind turbine component, wherein the nacelle roof is configured to cover the second wind turbine component, wherein the first sliding section and the second sliding section are moveable between a closed position, in which the second wind turbine component is covered by the nacelle roof, and an opened position, resulting in an opening of the nacelle roof through which the second wind turbine component can be hoisted.

Hence, multiple components of the wind turbine can be hoisted through the openings of the nacelle roof and the flexibility to move the sliding sections or stack of sliding sections eases the hoisting of components in or out of the nacelle.

According to another embodiment of the invention, the nacelle further comprises a drive train at least partially located below the nacelle roof, wherein said drive train comprises a main bearing and/or a gearbox and/or a generator.

According to another embodiment of the invention, the generator is the first wind turbine component, wherein the generator is at least partially located under the first sliding section when the first sliding section is in a closed position.

According to another embodiment of the invention, the gearbox is the second wind turbine component, wherein the gearbox is at least partially located under the second sliding section when the second sliding section is in a closed position.

An advantage of having a sliding section over a main component of the drive train, such as the generator or the gearbox, is that this main component can be more easily replaced by opening the sliding section over the main component.

According to another embodiment of the invention, the nacelle roof further comprises a third sliding section being moveable between a closed position and an opened position, wherein third sliding section is configured to slide over at least a part of the surface of the nacelle roof, in particular over the first sliding section and/or over the second sliding section.

Hence, the third sliding section can slide over the first and/or second sliding section. The third sliding section can also be configured so that the first and/or second sliding section can slide over the third sliding section.

According to an embodiment, the third sliding section is configured to be lifted by a lifting system, wherein the third sliding section is stackable over the first sliding section and/or the second sliding section.

According to an embodiment of the invention, the lifting system comprises shifting means coupled at the bottom part of the third sliding section for allowing the sliding of the third sliding section over at least a part of the surface of the nacelle roof. The lifting system further comprises rails placed under the shifting means, and studs supported on the nacelle by a supporting element, wherein an end of the studs abuts the rails.

According to another embodiment of the invention, a stack formed by the third sliding section with the first and/or second sliding section can axially move back and forth on at least a part of the surface of the nacelle roof.

According to another embodiment of the invention, the third sliding section and/or a stack comprising the third sliding section is configured to slide over at least a part of the static section.

According to another embodiment of the invention, the third sliding section comprises a plurality of panels.

The nacelle roof can comprise three or more sliding sections. The higher the number of sliding sections, the more sliding sections can be stacked on each other and the less the width of each section, resulting in larger openings and higher flexibility. However, the operational costs increase, as more operational time is needed to stack the sliding sections together. The number of sliding sections on the nacelle roof can be chosen depending on the size of the wind turbine and the number and size of the components within the nacelle.

According to another embodiment of the invention, the nacelle further comprises a third wind turbine component, wherein the nacelle roof is configured to cover the third wind turbine component, wherein the first sliding section and the second sliding section and third sliding section are moveable between a closed position, in which the third wind turbine component is covered by the nacelle roof, and an opened position, resulting in an opening of the nacelle roof through which the third wind turbine component can be hoisted.

According to another embodiment of the invention, the main bearing is the third wind turbine component, wherein the main bearing is at least partially located under the third sliding section when the third sliding section is in a closed position.

The advantage of having three sections is that each section can cover one main component of the drive train of the wind turbine, which is stored within the nacelle. Hence, the first sliding section covers the generator, the second sliding section covers the gearbox and the third sliding section covers the main bearing. Hence, for replacing one specific component, only the sliding section of the specific component needs to be shifted to have the opening over the specific component. If a crane is to be installed within the nacelle, then a second opening of another sliding section can be used for a crane to be deployed.

According to another embodiment of the invention, the first sliding section and/or the second sliding section and/or the third sliding section comprises a dome-shaped region. This dome-shaped region can be the region at the transition between the nacelle and the hub.

According to another embodiment of the invention, a crane can be deployed through the opening of the nacelle roof. The crane can be used for mounting or demounting wind turbine components. The use of a crane inside the nacelle is helpful if there is not enough space on the nacelle to install a crane, if other components on the nacelle hinder the use of a crane, such as a heliplatform, or if a secondary crane is needed.

This crane may operate inside the nacelle and can also be deployed from a stowed position underneath the nacelle roof to an operational position through the opening of the nacelle to hoist components outside of the wind turbine. The crane can also be suited to move components from the heliplatform to the inside of the nacelle. Mounting and removing a crane in the nacelle is expensive and inefficient because this process adds significant downtime to the repair or restoration of the wind turbine.

According to another embodiment of the invention, the crane is selectively positionable or the crane can be shifted within the nacelle at the region below the opening provided by the sliding sections. The crane can be mounted on rails to be able to shift the crane within the nacelle. Through the opening, the crane can hoist components in the nacelle or out of the nacelle.

Another aspect of embodiments of the invention relates to a method for mounting or demounting a first wind turbine component in a nacelle of a wind turbine, the nacelle having a nacelle roof with a first and a second sliding section. Said method comprises the steps of turning the studs abutting the rails in contact with the shifting means of the first sliding section, thereby increasing the height of the first sliding section until the shifting means of the first sliding section are above the top surface of the second sliding section, sliding the first sliding section over the top surface of the second sliding section to stack the first sliding section on top of the second sliding section, thereby leaving the region under the closed position of the first sliding section open, thereby resulting in an opening at the nacelle roof, and, mounting or demounting the first wind turbine component by hoisting it through the opening.

Another aspect of embodiments of the invention relates to a method for mounting or demounting a first wind turbine component in a nacelle of a wind turbine, the nacelle having a nacelle roof with a first, a second, and a third sliding section. After stacking the first sliding section on top of the second sliding section, said method comprises the steps of turning the studs abutting the rails in contact with the shifting means of the third sliding section, thereby increasing the height of the third sliding section until the shifting means of the third sliding section are above the top surface of the stack formed by the first and second sliding sections, and sliding the third sliding section over the top surface of the stack formed by the first and second sliding sections to stack the third sliding section on top of the first and second sliding sections, thereby increasing the size of the opening at the nacelle roof.

Similarly, the same process can be used for mounting or demounting a second or a third wind turbine component.

BRIEF DESCRIPTION

Some of the embodiments will be described in detail, with reference to the following figures, wherein like designations denote like members, wherein.

DETAILED DESCRIPTION

Figure 1:
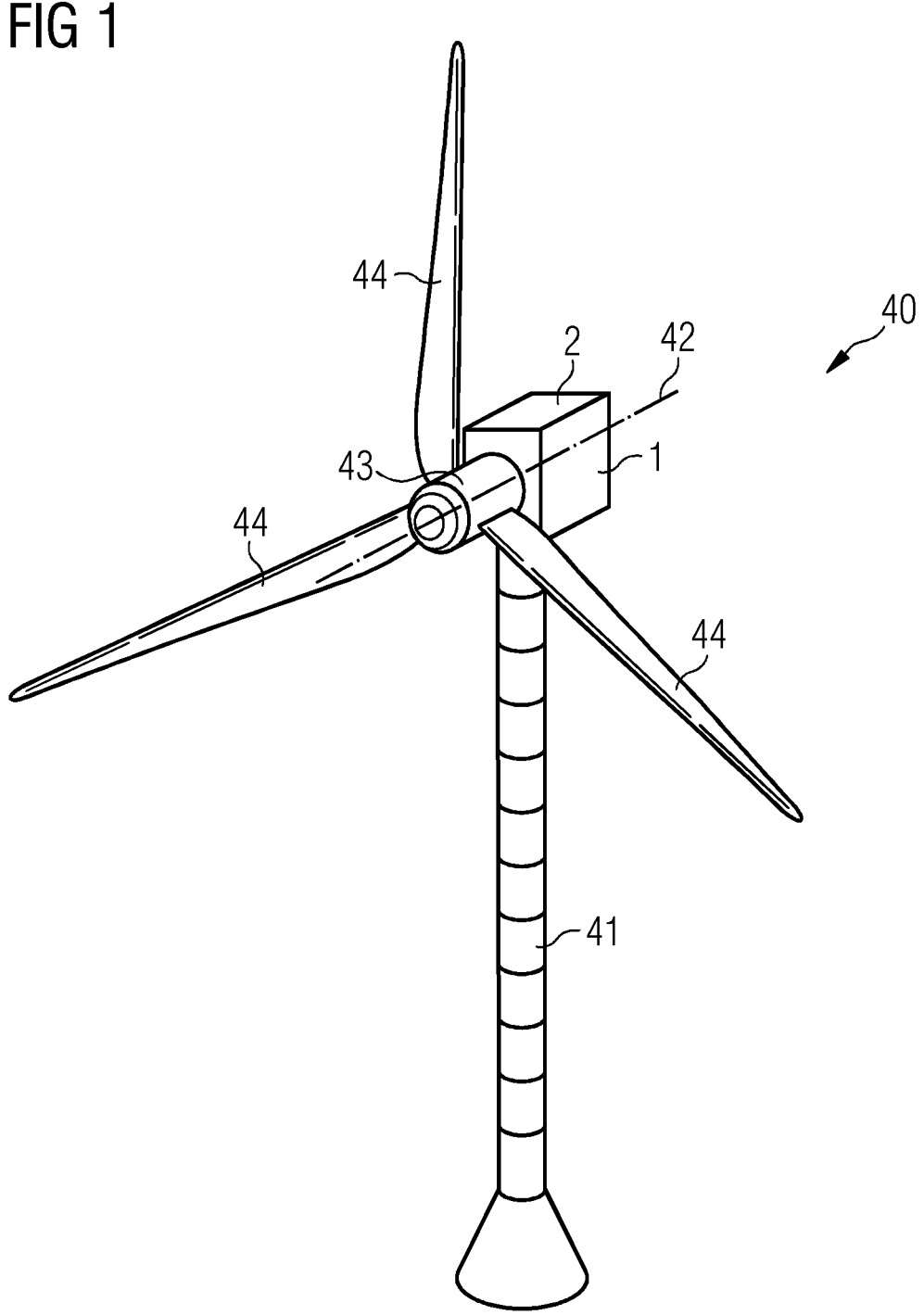
FIG. 1 shows a perspective view of a wind turbine.

FIG. 1 shows a wind turbine 40. The wind turbine 40 comprises a hub 43 connected to a generator (not shown) arranged inside a nacelle 1. The hub 43 comprises three wind turbine blades 44. The nacelle 1 is arranged at an upper end of a tower 41 comprising multiple tower sections. A longitudinal axis 42 passing through the nacelle 1 and the hub 43 is shown in the figure.

Figure 2:
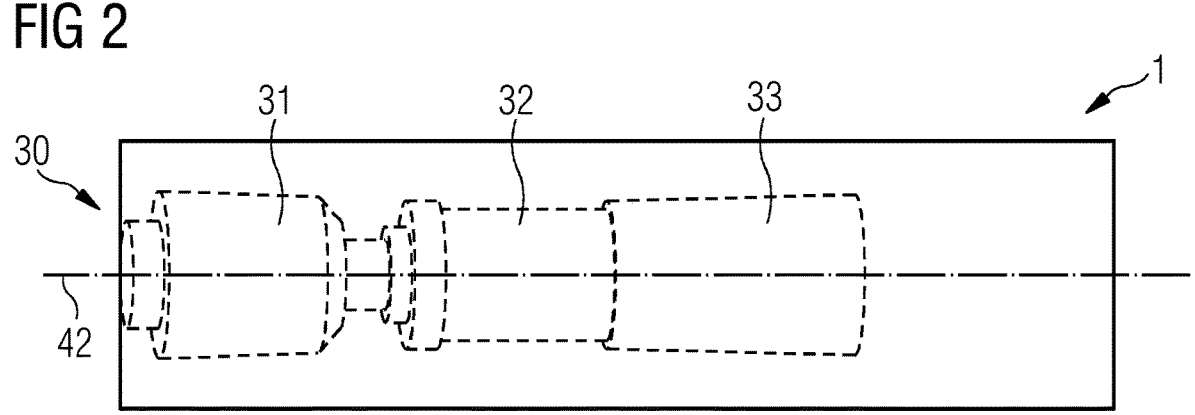
FIG. 2 shows a drive train inside a nacelle.

FIG. 2 shows a drive train 30 inside a nacelle 1. There are two main types of wind turbines 40, the ones with a gearbox 32 and direct drive gearless wind turbines 40. Here, a drive train 30 comprising a gearbox 32 is shown, but drive trains 30 without a gearbox 32 for direct drive gearless wind turbines 40 are also suitable for embodiments of the invention.

The drive train 30 comprises a main bearing 31, a gearbox 32 and a generator 33 arranged along the longitudinal axis 42 passing through the nacelle 1.

Figure 3:
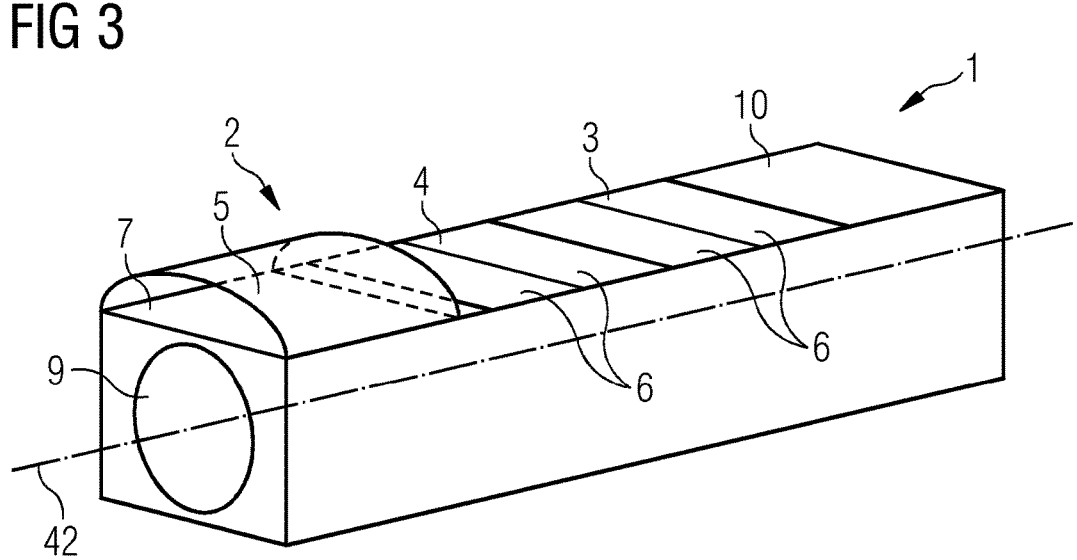
FIG. 3 shows a nacelle roof according to an embodiment of the present invention with three sliding sections.

FIG. 3 shows a nacelle roof 2 of a nacelle 1 according to an embodiment of the present invention with three sliding sections, which are a first sliding section 3, a second sliding section 4, and a third sliding section 5. At least the first and second sliding section 3, 4 comprise a plurality of panels 6. The nacelle roof 2 further comprises a static section 10, which is a part of the nacelle roof 2 fixed to the housing of the nacelle 1. The third sliding section 5 has a dome-shaped region 7, which is the region at the transition between the nacelle 1 and the hub 43. Through openings in the dome-shaped region 7, workers can pass from the nacelle 1 to the hub 43. The nacelle 1 comprises a front opening 9 at the surface in contact with the hub 43 for a main shaft of the wind turbine 40 to be able to extend from the hub 43 to the nacelle 1.

FIGS. 4 to 15 show the shifting of sliding sections 3, 4, 5 over the nacelle roof 2. In particular, FIGS. 4 to 8 show the side view and FIGS. 9 to 15 show the top view of the shifting of sliding sections 3, 4, 5 over the nacelle roof 2.

Figure 4:
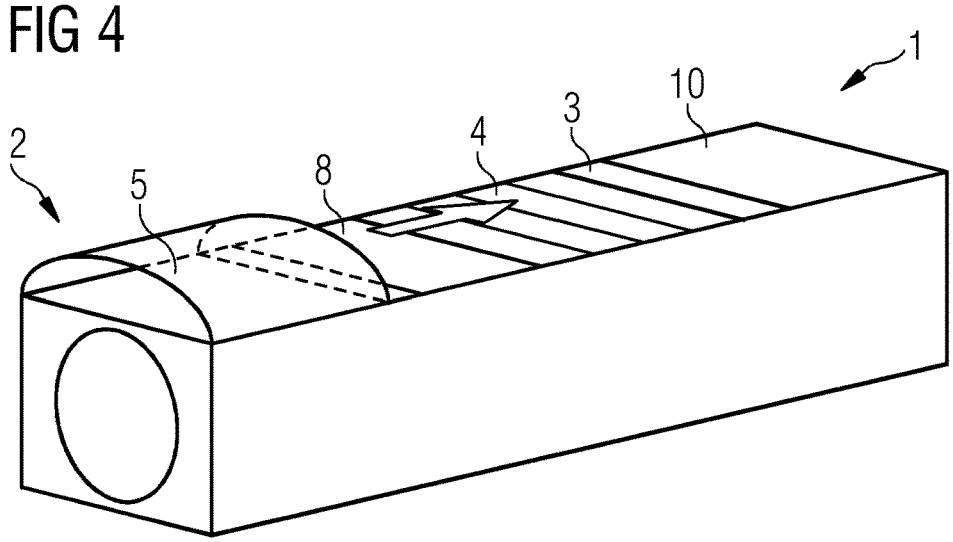
FIG. 4 shows a nacelle roof according to an embodiment of the present invention with three sliding sections.
Figure 5:
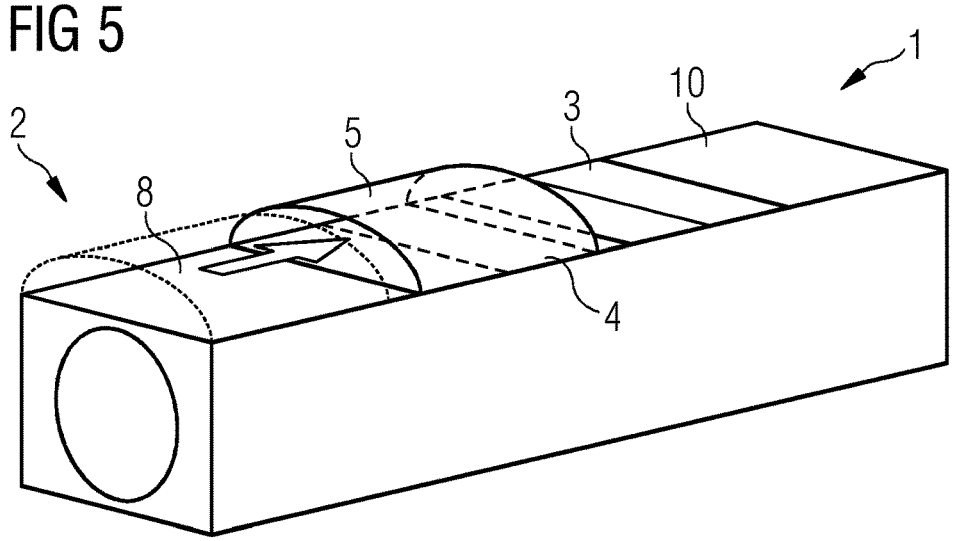
FIG. 5 shows a nacelle roof according to an embodiment of the present invention with three sliding sections.

FIG. 4 shows the shifting of the second sliding section 4 over the first sliding section 3. This shifting results in an opening 8 at the initial position of the second sliding section 4. Similarly, FIG. 5 shows the shifting of the third sliding section 5 over the second sliding section 4, resulting in an opening 8 at the region where the third sliding section 5 was positioned before the shift.

Figure 6:
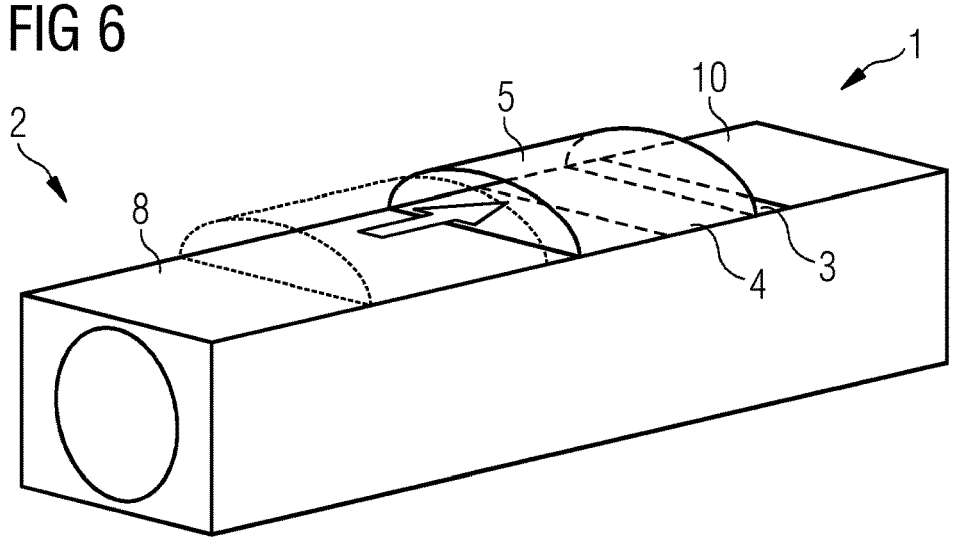
FIG. 6 shows a nacelle roof according to an embodiment of the present invention with three sliding sections.

After stacking the third sliding section 5 over the second sliding section 4, the opening 8 resulting from this shift can be further widened by stacking the stack of the third sliding section 5 and the second sliding section 4 over the first sliding section 3, as shown in FIG. 6. Hence, the first, second, and third sliding sections 3, 4, 5 can form a stack together. If a sliding section 3, 4, 5 has a dome-shaped region 7, as it is the case in this Figure with the third sliding section 5, then this particular sliding section will be stacked over the other sliding sections, as the other sliding sections can be flat and suited to support further sliding sections on top of them.

Figure 7:
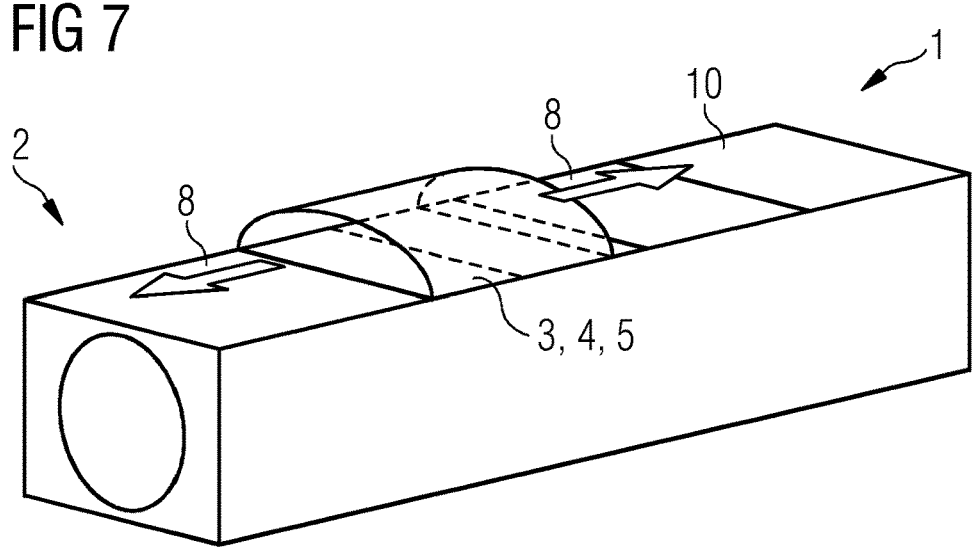
FIG. 7 shows a nacelle roof according to an embodiment of the present invention with three sliding sections.
Figure 8:
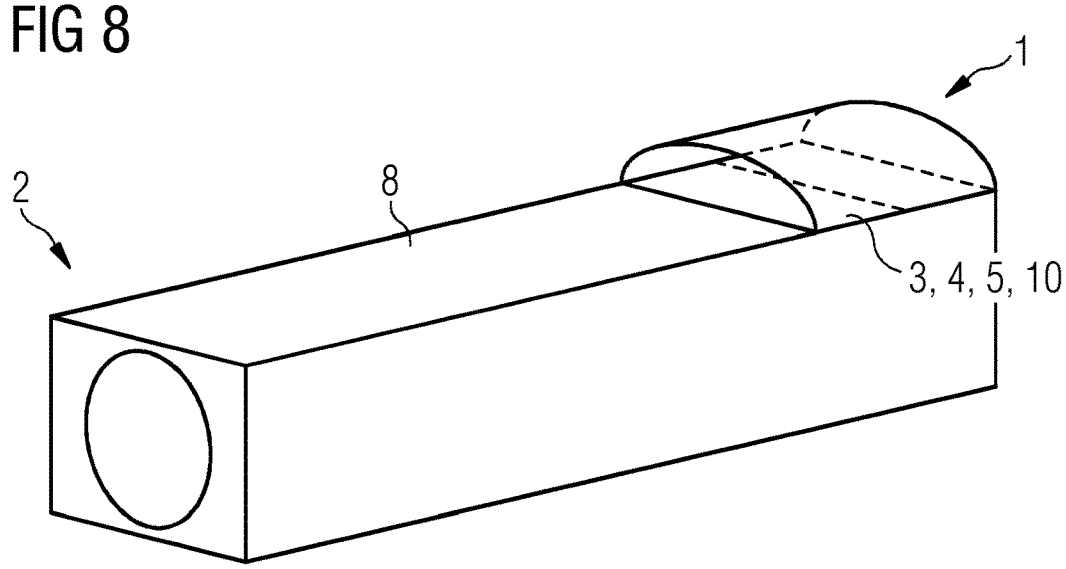
FIG. 8 shows a nacelle roof according to an embodiment of the present invention with three sliding sections.

As shown in FIGS. 7 and 8, the stack of the first, second, and third sliding sections 3, 4, 5 can be axially shifted over the nacelle roof 2. In FIG. 7, the stack of sliding sections 3, 4, 5 can axially move back and forth on the opening 8 of the nacelle roof 2. In FIG. 8, the stack of sliding sections 3, 4, 5 can axially move back and forth on the opening 8 of the nacelle roof 2, as well as on the static part 10 of the nacelle roof 2. The width of the opening 8 can be maximized by completely stacking all the sliding sections 3, 4, 5 on the static part 10 of the nacelle roof 2, as shown in FIG. 8.

Figure 9:
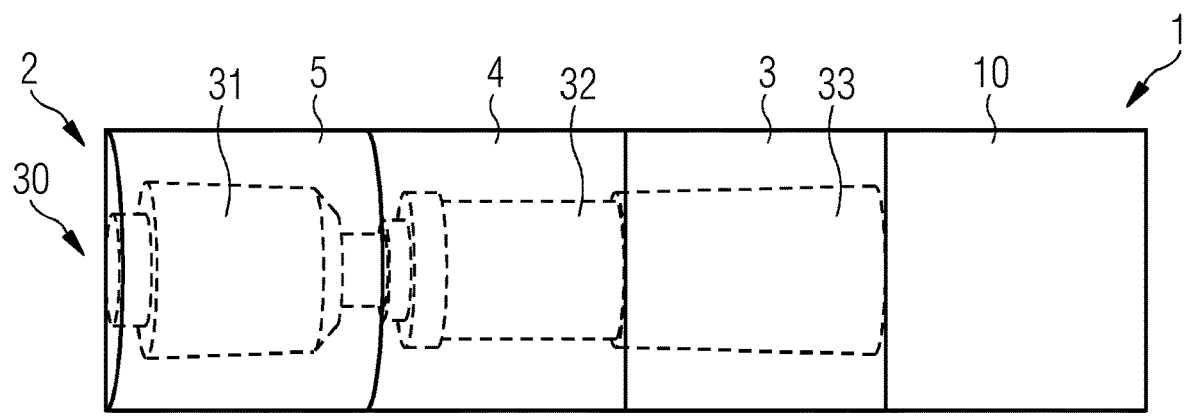
FIG. 9 shows a nacelle roof according to an embodiment of the present invention with three sliding sections.

FIG. 9 shows the top view of the nacelle roof 2. The drive train 30 is arranged under the sliding sections 3, 4, 5 to ease the mounting and demounting of components of the drive train 30 through openings 8 on the nacelle roof 2. In particular, the generator 33 of the drive train 30 is arranged under the first sliding section 3, the gearbox 32 of the drive train 30 is arranged under the second sliding section 4, and the main bearing 31 of the drive train 30 is arranged under the third sliding section 5.

Figure 10:
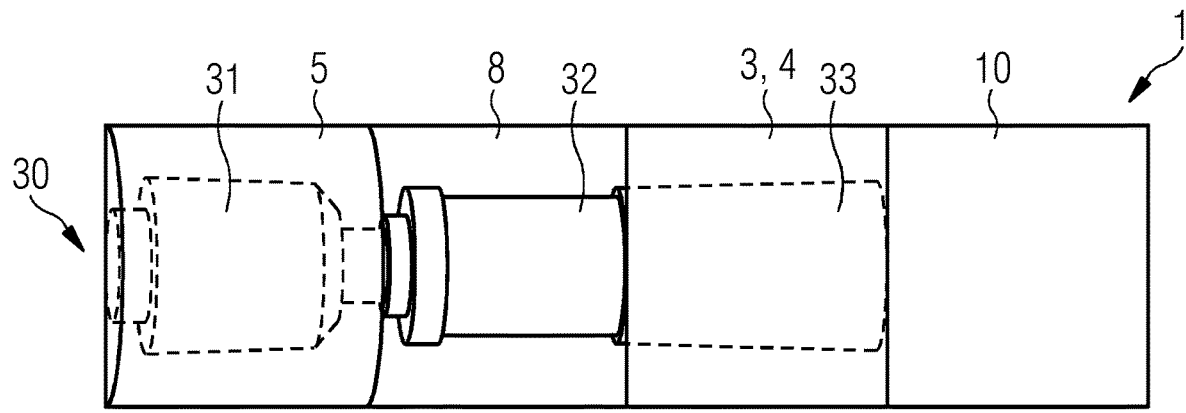
FIG. 10 shows a nacelle roof according to an embodiment of the present invention with three sliding sections.
Figure 11:
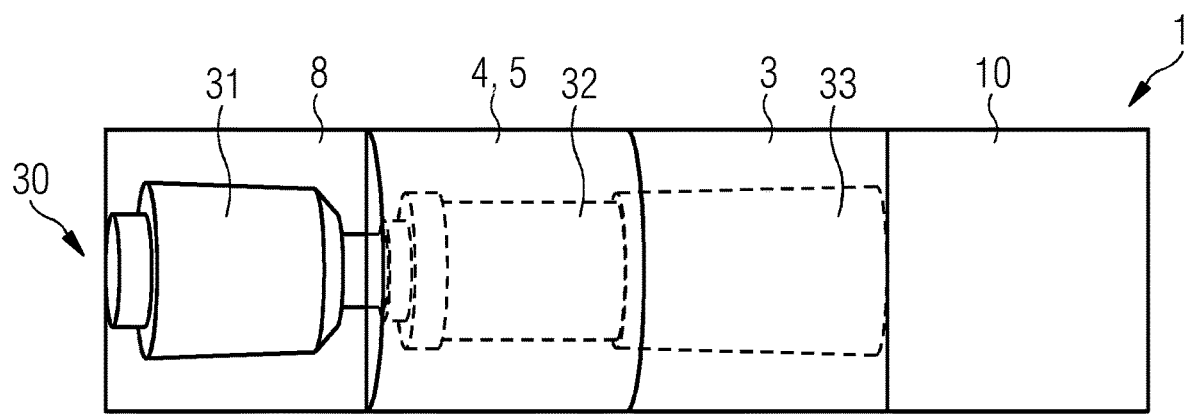
FIG. 11 shows a nacelle roof according to an embodiment of the present invention with three sliding sections.

FIG. 10 is the top view of the nacelle roof resulting from the shift shown in FIG. 4, where the second sliding section 4 is shifted over the first sliding section 3. This shifting results in an opening 8 over the gearbox 32, which allows to hoist the gearbox 32 out of the nacelle 1 or in the nacelle 1. Similarly, by shifting the third sliding section 5 over the second sliding section 4, an opening 8 over the main bearing 31 results, which allows to hoist the main bearing 31 out of the nacelle 1 or in the nacelle 1, as shown in FIG. 11.

Figure 12:
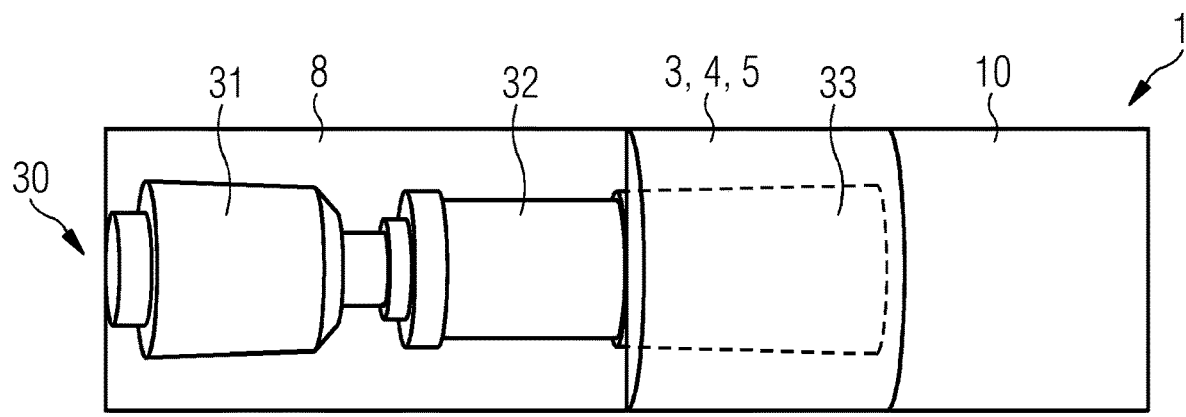
FIG. 12 shows a nacelle roof according to an embodiment of the present invention with three sliding sections.
Figure 13:
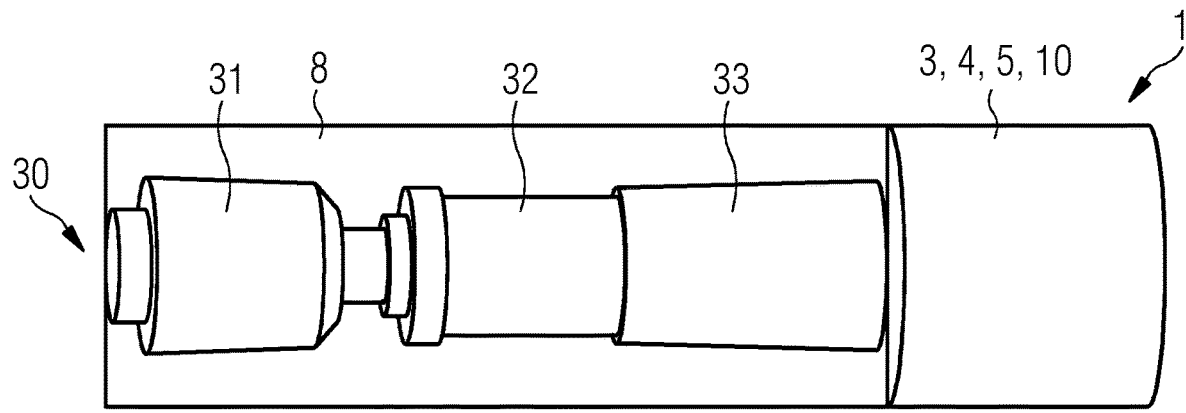
FIG. 13 shows a nacelle roof according to an embodiment of the present invention with three sliding sections.

FIG. 12 is the top view of the nacelle roof resulting from the shift shown in FIG. 6, where the stack of the third and second sliding sections 5, 4 is shifted over the first sliding section 3, resulting in an opening 8 over the main bearing 31 and the gearbox 32. If the stack of the first, second, and third sliding sections 3, 4, 5 is further shifted on the static part of the nacelle roof 2, as shown in FIGS. 8 and 13, the width of the opening 8 is maximized, in this case uncovering the complete drive train 30 comprising the main bearing 31, the gearbox 32, and the generator 33.

Figure 14:
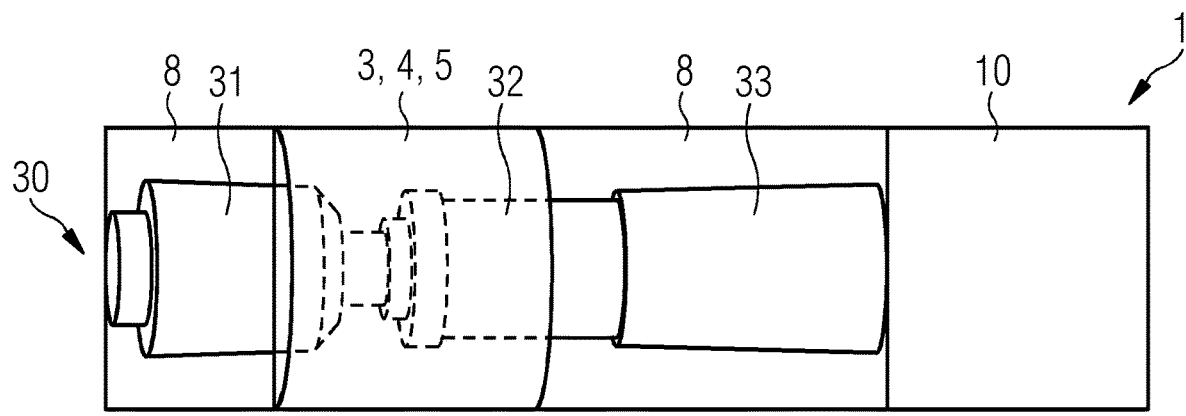
FIG. 14 shows a nacelle roof according to an embodiment of the present invention with three sliding sections.
Figure 15:
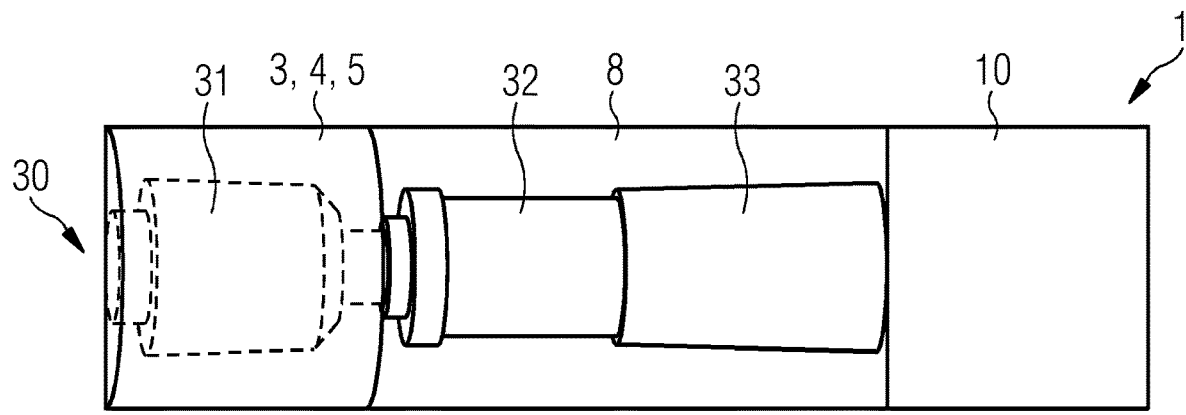
FIG. 15 shows the shifting of sliding sections over the nacelle roof.

The stack of the first, second, and third sliding sections 3, 4, 5 can be axially shifted over the nacelle roof 2, as shown in FIGS. 14 and 15. Even if the static part 10 of the nacelle roof 2 were not suited for the stack to be shifted on it, the shifting of the stack on the opening 8 of the nacelle roof 2 allows for a high flexibility for hoisting.

Figure 16:
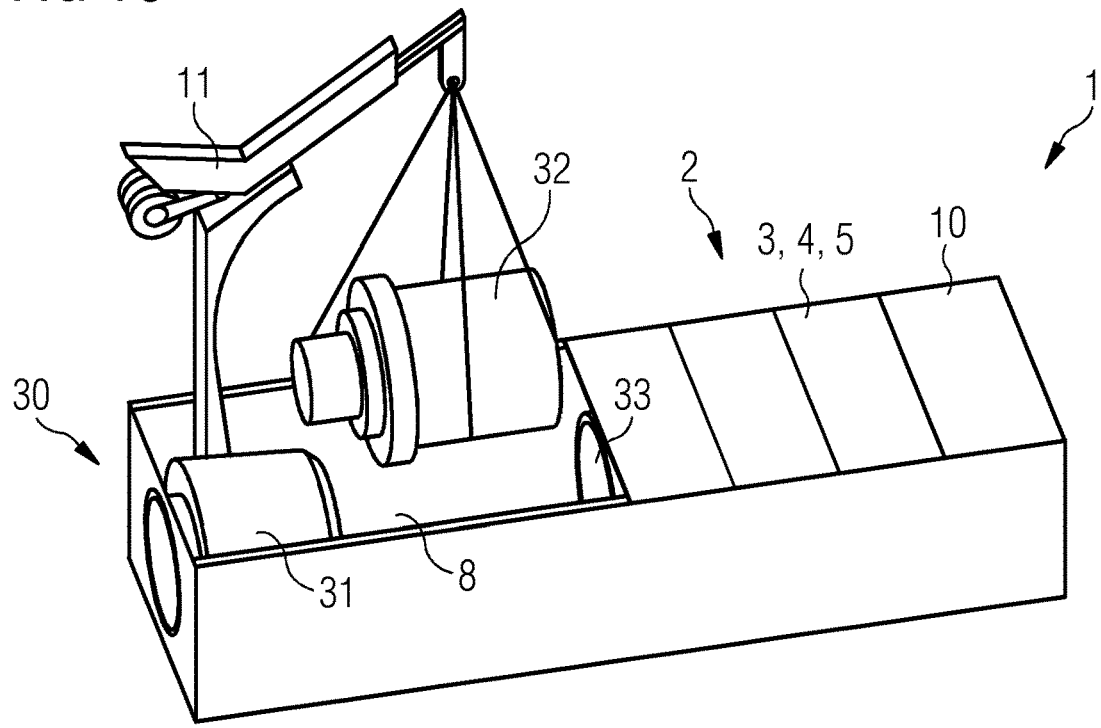
FIG. 16 shows the shifting of sliding sections over the nacelle roof.
Figure 17:
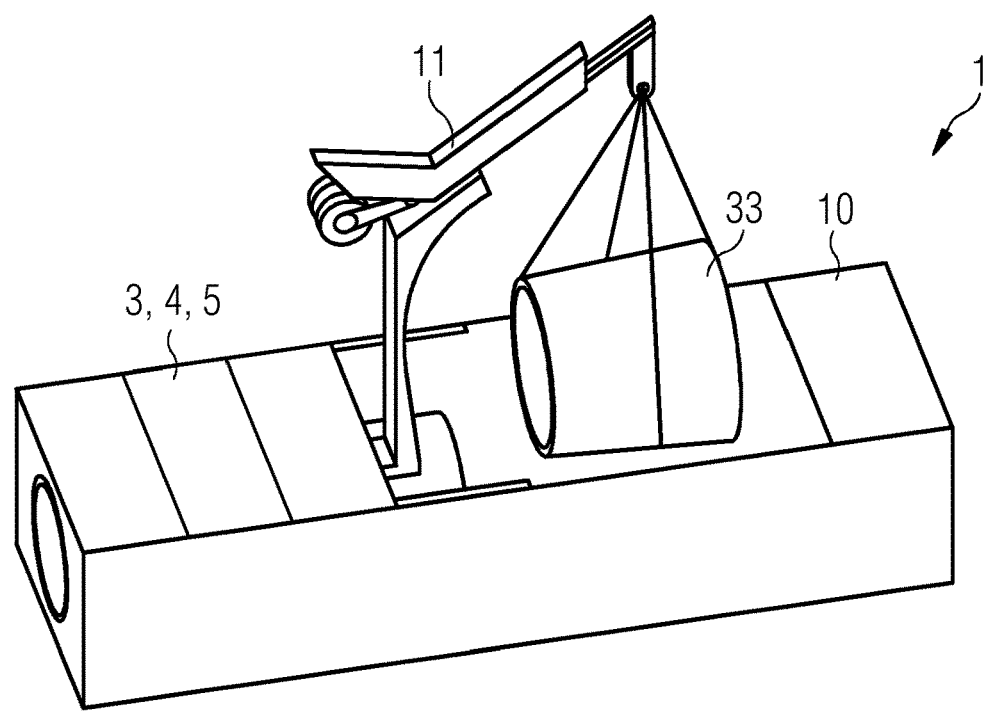
FIG. 17 shows a crane installed at different positions inside the nacelle.

FIGS. 16 and 17 show a crane 11 installed at different positions inside the nacelle 1. The crane 11 can be permanently installed at a position inside the nacelle 1 or moved inside the nacelle 1. Alternatively, a crane 11 installed on the static portion 10 of the nacelle roof 2 is also possible.

Due to the flexibility of operation of the shifting of the sliding sections 3, 4, 5, the crane 11 can be installed or deployed at multiple positions in the region of the opening 8. By shifting the stack of sliding sections 3, 4, 5, the crane 11 can be then deployed in a different position. This is very helpful depending on the component which is to be hoisted in the nacelle 1. For example, if the gearbox 32 is being installed or replaced, the stack of sliding sections 3, 4, 5 is shifted over the initial position of the first sliding section 3 and thus the crane 11 can be deployed over the main bearing 31 and the opening above the main bearing 31 and the gearbox 32 allows to hoist the gearbox 32 out of the nacelle 1, as shown in FIG. 16. Similarly, if the generator 33 is being installed or replaced, the stack of sliding sections 3, 4, 5 is shifted over the initial position of the third sliding section 5 and thus the crane 11 can be deployed over the gearbox 32 and the opening above the gearbox 32 and the generator 33 allows to hoist the generator 33 out of the nacelle 1, as shown in FIG. 17.

Figure 18:
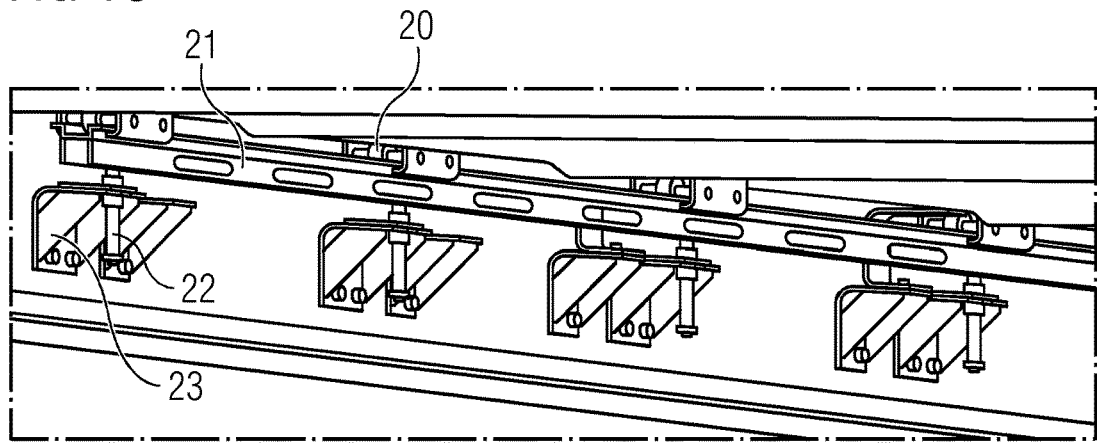
FIG. 18 shows a lifting system comprising shifting means, rails and studs.
Figure 19:
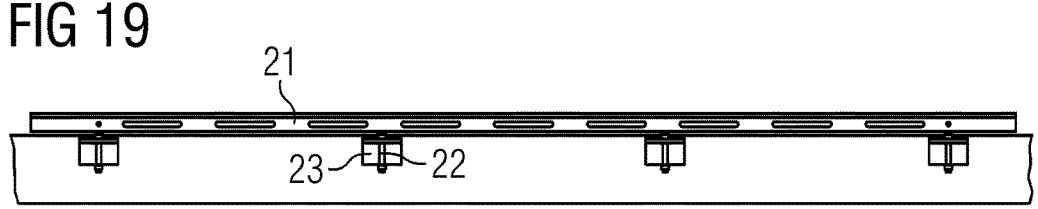
FIG. 19 shows a lifting system comprising shifting means, rails and studs.

FIG. 18 shows a lifting system 24 comprising shifting means 20, rails 21 and studs 22. The shifting means 20 are wheels coupled at the bottom part of the sliding section 3, 4, 5 and arranged parallelly to the longitudinal axis 42 of the nacelle 1 and the rails 21 are placed under the wheels. For one sliding section 3, 4, 5, two rails 21 can be placed parallelly to the longitudinal axis 42 under the sliding section 3, 4, 5 at each side of the sliding section 3, 4, 5 for a good stability of the sliding section 3, 4, 5 during the lifting and shifting. At last, studs 22 are supported on the nacelle 1 by a supporting element 23, in this case a bracket, wherein an end of the studs 22 abuts the rails 21.

FIGS. 19 to 26 show how a lifting system 24 is operated to lift, shift and stack sliding sections 3, 4, 5.

FIGS. 19 to 23 show a possible way of lifting the rails 21, which results in a lifting of the sliding sections 3, 4, 5 to roll and stack sliding sections 3, 4, 5 on each other. Here, four studs 22 in their corresponding supporting elements 23 are shown, which lift a single rail 21. For this, the studs 22 are turned or pressed by means of a screwdriver or a hammer, which results in the end of the studs 22 abutting the rail 21 pushing the rail 21 up and lifting the rail 21. As the studs 21 have a limited length, the height of the lifting is also limited, but can be controlled precisely by the length of the studs 22.

Figure 20:
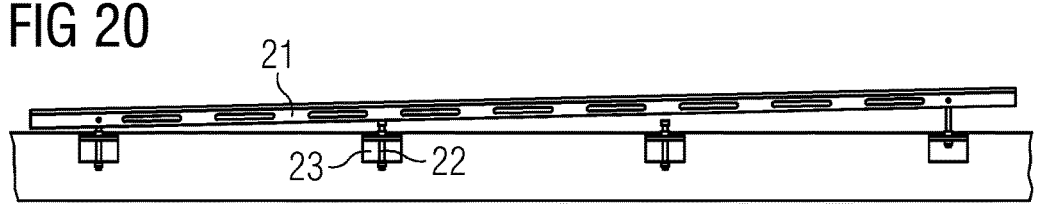
FIG. 20 shows a lifting system comprising shifting means, rails and studs.
Figure 21:
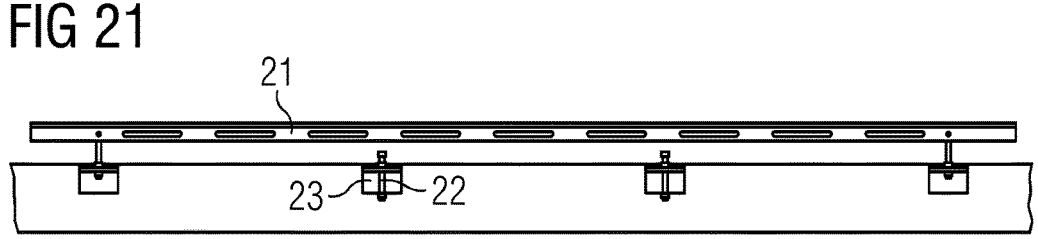
FIG. 21 shows a lifting system comprising shifting means, rails and studs.
Figure 22:
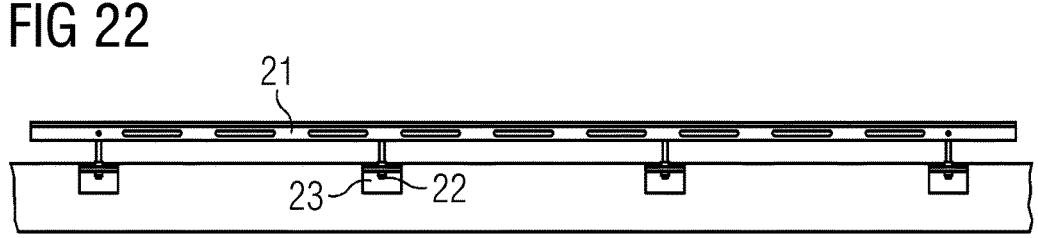
FIG. 22 shows a lifting system comprising shifting means, rails and studs.

In FIG. 20, a stud 22 at an end point is turned. Afterwards, as shown in FIG. 21, the stud 22 at the other end point is turned. To increase the stability of the rail 21 and to avoid a bending of the rail 21, the rest of the studs 22 between the end points can also be turned, as shown in FIG. 22.

FIGS. 23 to 26 show the lifting, stacking and shifting of the sliding sections 3, 4, 5 by means of the lifting system 24.

Figure 23:
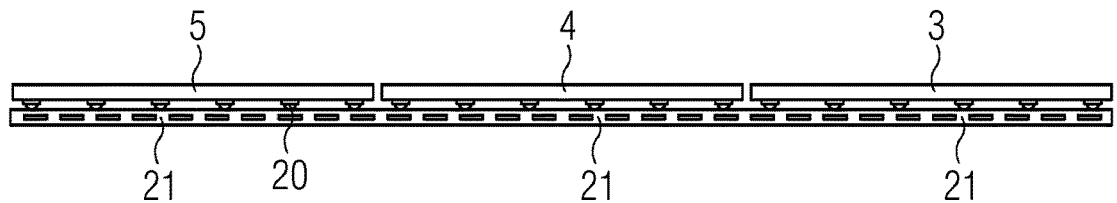
FIG. 23 shows a lifting system comprising shifting means, rails and studs.

FIG. 23 shows the initial position of the sliding sections 3, 4, 5. Under each sliding section 3, 4, 5, a rail 21 is placed. Each sliding section 3, 4, 5 comprises shifting means 20 configured as wheels to roll over other sliding sections 3, 4, 5 or other parts of the nacelle roof 2.

Figure 24:
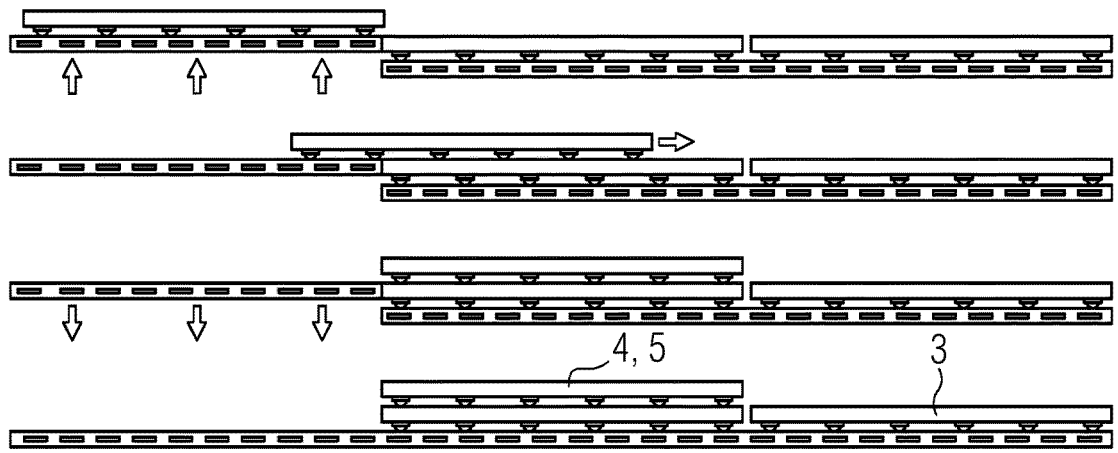
FIG. 24 shows a lifting system comprising shifting means, rails and studs.

FIG. 24 shows the stacking of the third sliding section 5 over the second sliding section 4. For this, the rail 21 under the third sliding section 5 is lifted, the third sliding section 5 is rolled over the second sliding section 4 by means of the wheels of the third sliding section 5, and the rail 21 of the third sliding section 5, which stayed in the lifted position as it is not coupled to the third sliding section 5, is lowered back to its initial position.

Figure 25:
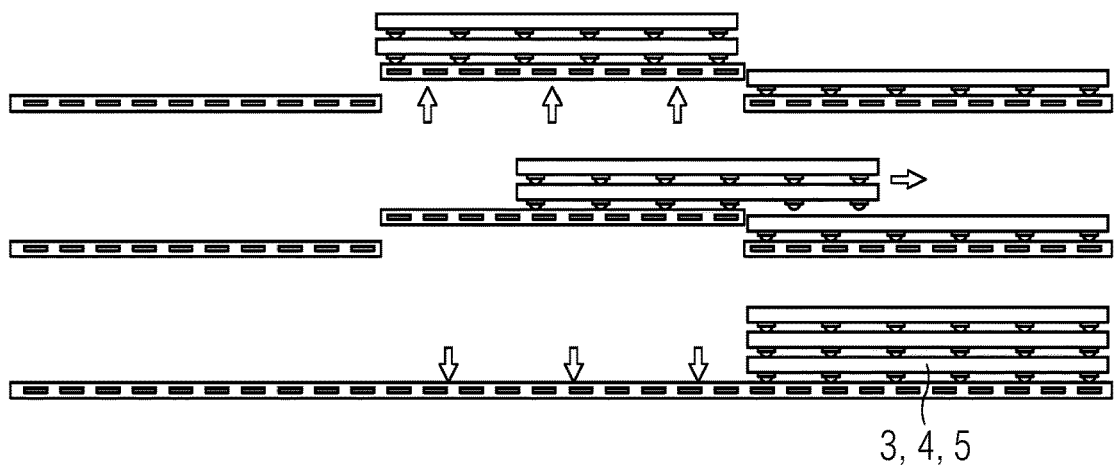
FIG. 25 shows a lifting system comprising shifting means, rails and studs.

FIG. 25 shows the stacking of the stack of the third and second sliding sections 4, 5 over the first sliding section 3. For this, the rail 21 under the stack of the third and second sliding sections 4, 5 is lifted, the stack is rolled over the first sliding section 3 by means of the wheels of the second sliding section 4, which is the lowest section in the stack, and the rail 21 of the second sliding section 4 used to lifted the stack is lowered back to its initial position.

Figure 26:
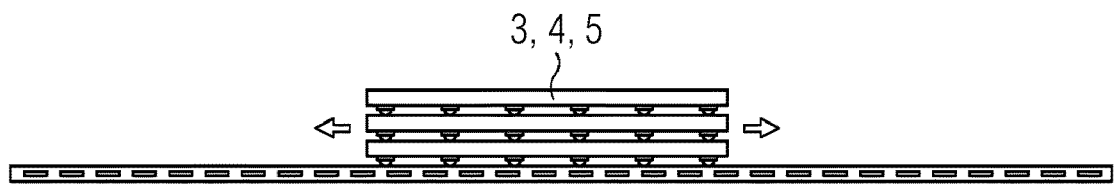
FIG. 26 shows how a lifting system is operated to lift, shift and stack sliding sections.

When all rails 21 are lowered to their initial position, the stack of sliding sections 3, 4, 5 can freely move axially on the rails 21, as shown in FIG. 26.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE NUMBERS

1 Nacelle
2 Roof
3 First sliding section
4 Second sliding section
5 Third sliding section
6 Panels
7 Dome-shaped region
8 Roof opening
9 Front opening
10 Static section
11 Crane
20 Shifting means
21 Rail
22 Stud
23 Bracket/supporting element
24 Lifting system
30 Drive train
31 Main bearing
32 Gearbox
33 Generator
40 Wind turbine
41 Tower
42 Longitudinal axis
43 Hub
44 Blade

The invention claimed is:

1. A nacelle for a wind turbine comprising a nacelle roof and a first wind turbine component,
    wherein the nacelle roof is configured to cover the first wind turbine component,
    the nacelle roof comprising a first sliding section and a second sliding section,
    wherein the first sliding section and/or the second sliding section is configured to slide over at least a part of the surface of the nacelle roof,
    wherein the first sliding section and the second sliding section are moveable between a closed position, in which the first wind turbine component is covered by the nacelle roof, and an opened position, resulting in an opening of the nacelle roof through which the first wind turbine component is hoisted,
    wherein the first sliding section is configured to slide over the second sliding section and/or the second sliding section is configured to slide over the first sliding section,
    wherein the first sliding section and/or the second sliding section is configured to be lifted by a lifting system, wherein the first sliding section is stackable over the second sliding section and/or the second sliding section is stackable over the first sliding section,
    wherein the lifting system comprises
    shifting means coupled at the bottom part of the first sliding section and/or the second sliding section for allowing the sliding of the first and/or second sliding section over at least a part of the surface of the nacelle roof,
    rails placed under the shifting means, and
    studs supported on the nacelle by a supporting element, wherein an end of the studs abuts the rails.

2. The nacelle according to claim 1, wherein a stack of the first sliding section and the second sliding section can axially move back and forth on at least a part of the surface of the nacelle roof.

3. The nacelle according to claim 1, wherein the nacelle roof further comprises a static section, the static section being a part of the nacelle roof fixed to the housing of the nacelle, wherein the first sliding section and/or the second sliding section is configured to slide over at least a part of the static section.

4. The nacelle according to claim 1, wherein the first sliding section and/or the second sliding section comprises a plurality of panels.

5. The nacelle according to claim 1, wherein the nacelle further comprises a second wind turbine component,
wherein the nacelle roof is configured to cover the second wind turbine component,
wherein the first sliding section and the second sliding section are moveable between a closed position, in which the second wind turbine component is covered by the nacelle roof, and an opened position, resulting in an opening of the nacelle roof through which the second wind turbine component is hoisted.

6. The nacelle according to claim 5, wherein the nacelle further comprises a drive train at least partially located below the nacelle roof, wherein the drive train comprises a main bearing and/or a gearbox and/or a generator.

7. The nacelle according to claim 6, wherein the generator is the first wind turbine component, wherein the generator is at least partially located under the first sliding section when the first sliding section is in a closed position.

8. The nacelle according to claim 6, wherein the gearbox is the second wind turbine component, wherein the gearbox is at least partially located under the second sliding section when the second sliding section is in a closed position.

9. The nacelle according to claim 6, wherein the nacelle roof further comprises a third sliding section being moveable between a closed position and an opened position, wherein third sliding section is configured to slide over at least a part of the surface of the nacelle roof.

10. The nacelle according to claim 9, wherein the main bearing is at least partially located under the third sliding section, wherein the main bearing is a third wind turbine component comprised in the nacelle which is hoisted through an opening of the nacelle roof when the third sliding section is in an opened position.

11. The nacelle according to claim 9, wherein the first sliding section and/or the second sliding section and/or the third sliding section comprises a dome-shaped region.

12. A method for mounting or demounting a first wind turbine component in a nacelle of a wind turbine, the method comprising the steps of:
providing the wind turbine, wherein the nacelle roof is configured to cover the first wind turbine component, the nacelle roof comprising a first sliding section and a second sliding section, wherein the first sliding section and/or the second sliding section is configured to slide over at least a part of the surface of the nacelle roof, wherein the first sliding section and the second sliding section are moveable between a closed position, in which the first wind turbine component is covered by the nacelle roof, and an opened position, resulting in an opening of the nacelle roof through which the first wind turbine component is hoisted, wherein the first sliding section is configured to slide over the second sliding section and/or the second sliding section is configured to slide over the first sliding section, wherein the first sliding section and/or the second sliding section is configured to be lifted by a lifting system, wherein the first sliding section is stackable over the second sliding section and/or the second sliding section is stackable over the first sliding section, wherein the lifting system comprises shifting means coupled at the bottom part of the first sliding section and/or the second sliding section for allowing the sliding of the first and/or second sliding section over at least a part of the surface of the nacelle roof, rails placed under the shifting means, and studs supported on the nacelle by a supporting element, wherein an end of the studs abuts the rails,
turning the studs abutting the rails in contact with the shifting means of the first sliding section, thereby increasing the height of the first sliding section until the shifting means of the first sliding section are above the top surface of the second sliding section,
sliding the first sliding section over the top surface of the second sliding section to stack the first sliding section on top of the second sliding section, thereby resulting in an opening at the nacelle roof, and,
mounting or demounting the first wind turbine component by hoisting it through the opening.

13. The method for mounting or demounting the first wind turbine component in the nacelle of the wind turbine according to claim 12, wherein the nacelle roof further comprises a third sliding section and the lifting system comprises shifting means coupled at the bottom part of the third sliding section, the method further comprising the step of:
turning the studs abutting the rails in contact with the shifting means of the third sliding section, thereby increasing the height of the third sliding section until the shifting means of the third sliding section are above the top surface of the stack formed by the first and second sliding sections, and
sliding the third sliding section over the top surface of the stack formed by the first and second sliding sections to stack the third sliding section on top of the first and second sliding sections, thereby increasing the size of the opening at the nacelle roof.

\* \* \* \* \*